United States Patent
McMahon

(10) Patent No.: US 7,042,341 B2
(45) Date of Patent: May 9, 2006

(54) DEVICE INCLUDING LIGHT EMITTING DIODE AS LIGHT SENSOR AND LIGHT SOURCE

(75) Inventor: Michael T. McMahon, Salem, OH (US)

(73) Assignee: Overhead Door Corporation, Lewisville Tx ( * ) Notice: Subject to any disclaimer, the term of this patent is extended or adjusted under 35 U.S.C. 154(b) by 36 days.

(21) Appl. No.: 10/639,374

(22) Filed: Aug. 12, 2003

(65) Prior Publication Data

US 2005/0036294 A1  Feb. 17, 2005

(51) Int. Cl.
B60R 25/10  (2006.01)

(52) U.S. Cl. .............................. 340/426.13; 340/539.3; 340/693.3; 340/815.45; 340/825.44; 345/102; 455/574

(58) Field of Classification Search ........... 340/426.13, 340/426.14, 426.15, 426.16, 469, 539.22, 340/539.26, 539.3, 600, 639.19, 636.2, 693.3, 340/815.4, 815.52, 815.45, 815.53, 825.44; 455/566, 574, 550.1; 315/291; 345/102; 362/24, 84, 88, 85, 86, 276
See application file for complete search history.

(56) References Cited

U.S. PATENT DOCUMENTS

| 4,202,000 A | 5/1980 | Carballes .................... 357/19 |
|---|---|---|
| 4,317,232 A | 2/1982 | Pickett et al. ............... 455/606 |
| 4,564,756 A | 1/1986 | Johnson ...................... 250/206 |
| 5,097,299 A | 3/1992 | Donhowe et al. ............. 357/19 |
| 5,119,224 A | 6/1992 | Smith ......................... 359/153 |
| 5,252,960 A * | 10/1993 | Duhame .................... 340/5.64 |
| 5,655,826 A * | 8/1997 | Kouno et al. ................. 362/24 |
| 5,766,155 A * | 6/1998 | Hyman et al. .............. 604/151 |
| 6,215,409 B1 * | 4/2001 | Blach ....................... 340/815.4 |
| 6,299,322 B1 * | 10/2001 | Yokota ........................ 362/85 |
| 6,449,437 B1 | 9/2002 | Ogawa ....................... 396/281 |
| 6,664,744 B1 * | 12/2003 | Dietz ......................... 315/291 |
| 2002/0142808 A1 * | 10/2002 | Abbasi ....................... 455/566 |
| 2004/0195494 A1 * | 10/2004 | Kok et al. ............ 250/214 AL |

* cited by examiner

Primary Examiner—Brent A. Swarthout

(74) Attorney, Agent, or Firm—Gardere Wynne Sewell LLP

(57) ABSTRACT

A battery operated controller for a door operator includes a keypad backlit by a light emitting diode operably connected to a microcontroller which also controls operation of the controller. The microcontroller periodically measures ambient light as sensed by the light emitting diode and when a voltage level related to a predetermined light intensity decreases below a predetermined level the light emitting diode is energized to provide backlighting for the controller keypad. The intensity of backlighting may be varied in accordance with the amount of ambient light illuminating the keypad and above a certain intensity of ambient light the light emitting diode is de-energized to conserve battery power.

12 Claims, 3 Drawing Sheets

DEVICE INCLUDING LIGHT EMITTING DIODE AS LIGHT SENSOR AND LIGHT SOURCE

BACKGROUND

Certain battery operated devices utilize light emitting diodes (LEDs) as light sources. For example, garage door opener controller devices, sometimes referred to as consoles, are often provided with backlit keypads and operating switches so that the openers may be actuated under poor or nonexistent ambient light. However, conventional garage door opener consoles are characterized by LED light sources which are always "on" at a constant intensity and thus comprise a drain on battery power which shortens battery life unnecessarily. Thus, it would be advantageous if battery operated devices, such as garage door opener consoles, were provided which reduce consumption of battery power during daylight hours when artificial and power consuming light sources are not required. It is to these ends that the present invention has been developed.

SUMMARY OF THE INVENTION

The present invention provides a battery powered device, such as a garage door opener controller, which utilizes at least one light emitting diode (LED) as a light source and a light sensor for adjusting the intensity of the light source as required by ambient light conditions.

In accordance with one aspect of the present invention, a garage door opener controller or console is provided with circuitry which includes a keypad backlight source comprising an LED, which LED is connected to a control circuit for sensing ambient light and for adjusting the intensity of light emitted by the LED, thus conserving battery power during conditions of adequate ambient light.

In accordance with another aspect of the invention, a device is provided which includes a keypad and a source of lighting for such keypad comprising an LED. The LED is connected to a microcontroller, senses ambient light and causes the microcontroller to adjust an electrical signal imposed on the LED to adjust the intensity of lighting of the keypad in accordance with ambient light conditions.

Still further, the present invention provides a garage door opener controller device, such as a wall console, which is battery powered, includes a keypad for entering a personal identification or access code and/or a door open-close button type switch actuator and an LED backlight source, which backlight source also senses ambient light and, together with a microcontroller, operates to adjust the voltage imposed on the LED in the light source operating mode to conserve battery power during periods when ambient light is adequate for viewing the keypad and/or door control switch actuator.

The present invention is advantageous in that the cost of a dedicated photosensor and associated circuitry is eliminated thus providing for the reduction in space required by such circuitry and costs associated therewith. Improved battery life for devices according to the present invention is provided and the circuitry of the invention provides for efficient utilization of microcontroller or integrated circuit devices where only one input/output (I/O) pin or terminal is used for sensing ambient light and for providing backlighting versus the use of plural dedicated pins for each function in prior art devices. Thus, by reducing the required microcontroller pin count, the cost of the control circuitry is reduced. Since an LED cannot operate in both light sensing and light emitting mode simultaneously, a microcontroller connected to the LED may set a digital input/output line to be an analog input. The ambient light level is sensed by the LED operating in a photovoltaic mode and the microcontroller converts an analog input to digital form and determines if backlighting should be "on" or "off" and at a suitable level of modulation in the "on" mode. Further, in accordance with the invention, a microcontroller is provided which is operated in a manner which sets the digital input/output line as a digital output and turns the LED on or off or modulates the intensity of light emitted thereby. Moreover, the microcontroller may be configured such that the steps described above may be repeated as often as appropriate for a particular application.

Those skilled in the art will appreciate that the invention may be used for battery operated devices having other types of displays that incorporate backlighting including wireless-keyless entry control devices, and portable/hand held devices including test equipment and communication devices.

Those skilled in the art will further appreciate the advantages and superior features of the invention upon reading the detailed description which follows in conjunction with the drawings.

DETAILED DESCRIPTION OF A PREFERRED EMBODIMENT

Figure 1:
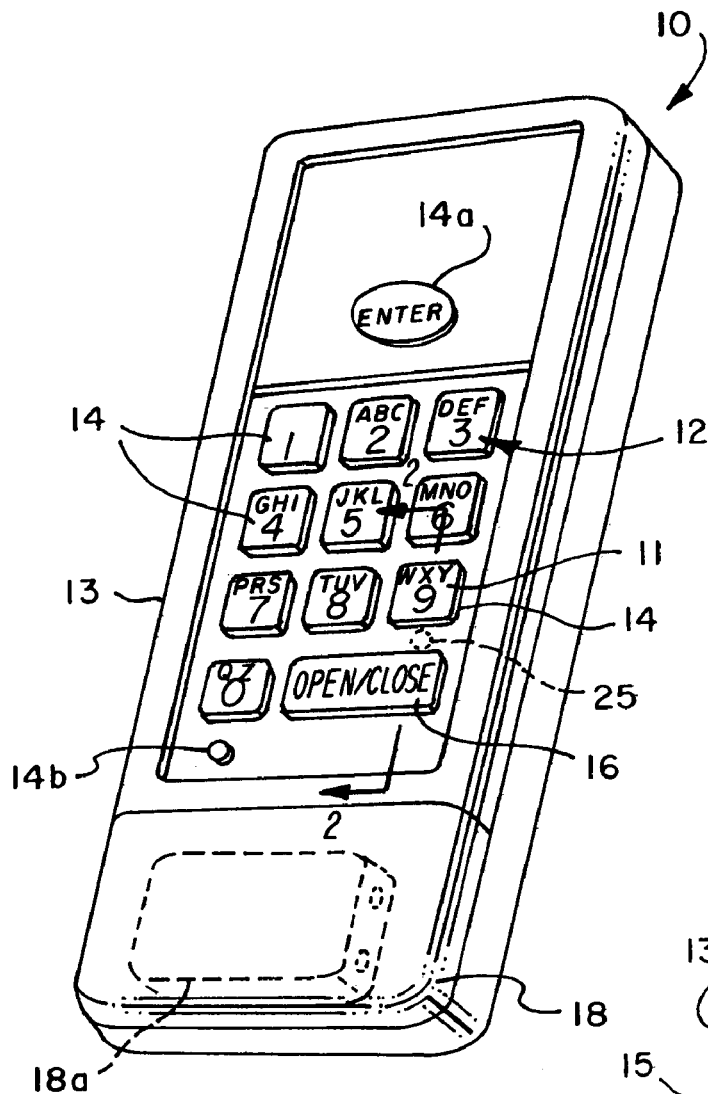
FIG. 1 is a perspective view of a device in accordance with the invention comprising a battery powered wall console controller unit for a garage door operator.

In the description which follows like parts are marked throughout the specification and drawing with the same reference numerals, respectively. The drawing figures are not necessarily to scale and certain features may be shown exaggerated in scale or in somewhat generalized or schematic form in the interest of clarity and conciseness.

Referring to FIG. 1, there is illustrated a device in accordance with the invention comprising a wall console type controller unit 10 for remote control of a garage door operator, not shown. The console controller 10 is typically of a type which may be mounted on an exterior wall of a residential or commercial building for operating a door, such as an upward acting garage door, by entering a multi-digit code by way of a keypad 12 including alphanumeric push button switch actuators 14 and an operate or open/close switch actuator 16, for example. The door operator controller or console 10 may be programmable for adding or deleting selected multi-digit codes associated with persons authorized to control the door operator. The controller 10 is characterized by a generally rectangular housing 11 mountable on a wall, not shown. Housing 11 includes a separable cover member 13, FIG. 1. A battery compartment for supplying electrical power to the controller is accessed through a removable cover 18 and said compartment contains a battery 18a.

Figure 2:
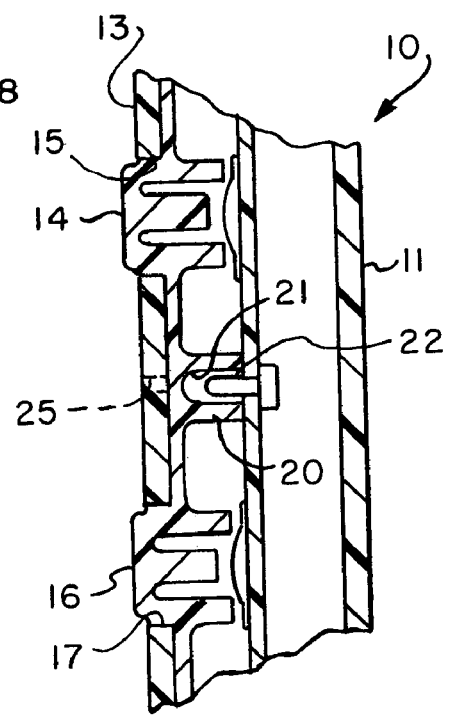
FIG. 2 is a detail section view taken generally along the line 2—2 of FIG. 1.

Referring also to FIG. 2, the alphanumeric keypad switch actuators 14 and the open/close switch actuator 16 are of a type wherein a somewhat flexible light transmitting molded polymer pad part 20 forms the button type actuators 14 and 16 for respective switches whereby the button actuators 14 and 16 project through suitable openings 15 and 17, respectively, formed in cover part 13. At least one light emitting diode 22 is mounted within the housing 11, as shown in FIG. 2, and projects light onto the light transmitting pad 20 for transmission to the button actuators 14 and 16 whereby the respective button actuators are suitably illuminated for viewing in low ambient light conditions. LED 22 is exemplary and more than one LED may be used to backlight the pad part 20 and the respective button type actuators 14 and 16.

In many applications LEDs are so-called forwardly biased electrically and are designed to operate at an electrical current flowing therethrough that provides suitable brightness to illuminate objects, such as the switch pad part 20, for example. Under such conditions LEDs are referred to as operating in the light emitting mode. However, LEDs can be used as photosensors when not forwardly biased. For example, when light strikes an LED, a voltage is produced across the LED in the so-called photovoltaic mode and the voltage increases as the intensity of light striking the LED increases. Accordingly, ambient light is also transmitted from the button actuators 14 and/or 16 to the cavity 21, FIG. 2, in which the LED 22 is projecting and this ambient light is sensed by the LED. Alternatively, a suitable opening 25, FIGS. 1 and 2, may be provided in the cover 13 to provide a more direct path for light onto and through the pad part 20 for sensing by the LED 22.

LEDs normally cannot operate in the light emitting and light sensing mode simultaneously. Accordingly, one preferred mode of operation for an LED which is both light emitting and light sensing is to connect the LED operably to a circuit, such as a microcontroller, in such a way that ambient light is sensed by the LED operating in the photovoltaic mode whereby the aforementioned microcontroller converts an analog input signal from the LED to digital form and determines if the backlight provided by the LED should be on or off, or determines the appropriate level of light to be emitted by the LED.

Figure 3:
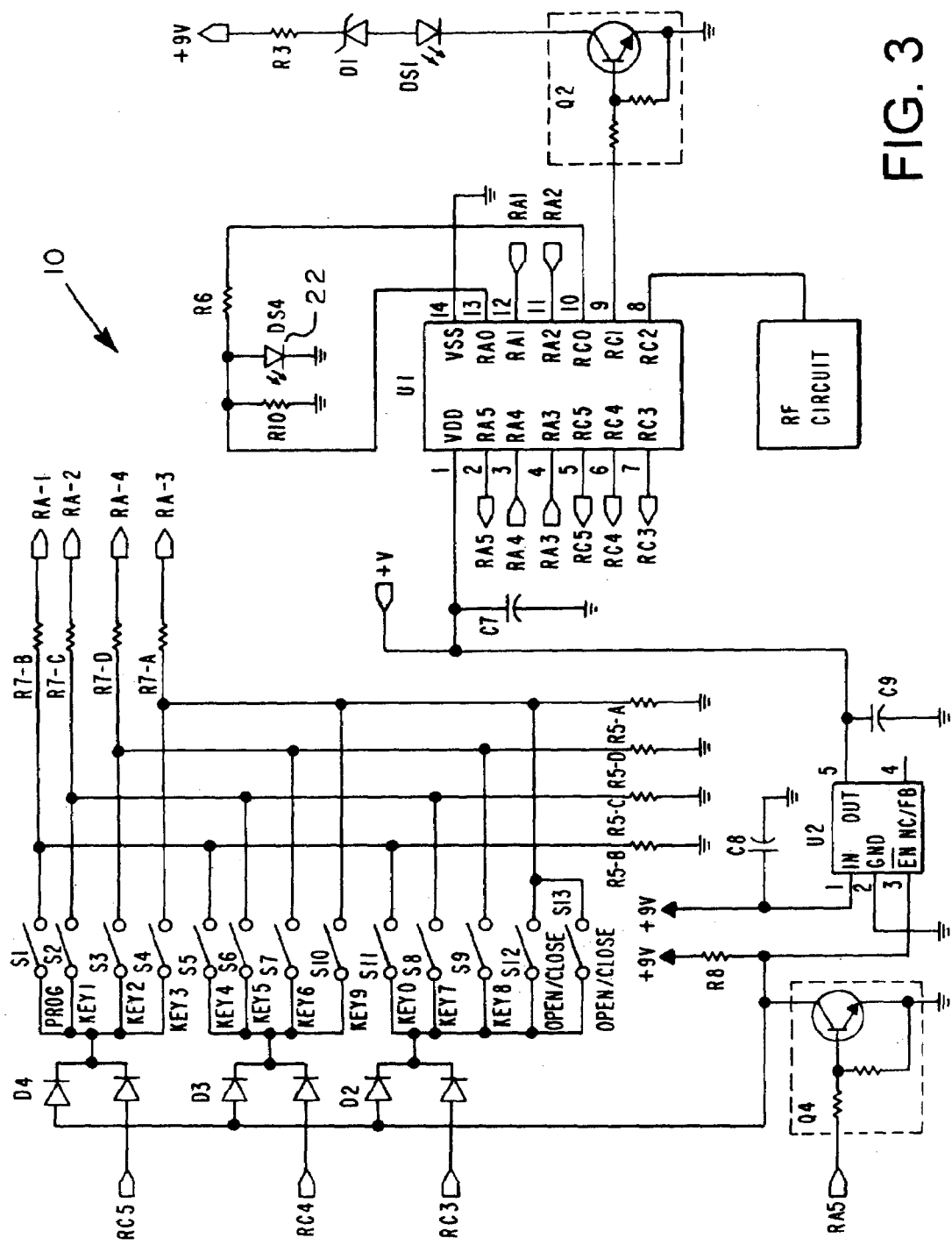
FIG. 3 is a circuit diagram of certain circuit elements for the console controller unit shown in FIGS. 1 and 2.

Referring now to FIG. 3, there is illustrated a diagram for a preferred circuit for the operator controller 10. Circuitry represented by the diagram of FIG. 3 is disposed within the housing 11 and suitably connected to a source of electrical power comprising battery 18a, FIG. 1. A microcontroller U1, FIG. 3, is operable to output a predetermined voltage on output terminal RC0 which forward biases LED 22 energizing same and providing backlighting for the switch pad part 20 and the individual switch actuators 14 and 16. This backlighting, of course, draws current from battery 18a and reduces the operating life of same. However, when the circuit of FIG. 3 is first energized by the battery 18a, the microcontroller U1 sets an output on terminal RC0 to a high impedance state. Terminal RA0 is then configured as an analog input and the microcontroller performs an analog to digital conversion on terminal RA0 measuring the voltage across the LED 22. Light striking the pad part 20 via the actuators 14 or 16 or via the opening 25 is transmitted to the LED 22 thus creating a voltage developed as a consequence of the intensity of such light. Microcontroller U1 may be programmed such that, at a preset voltage level emitted by the LED 22 corresponding to adequate ambient light, the microcontroller U1 will not energize the LED 22 in the lighting mode. Accordingly, the LED 22 is energized to backlight the pad part 20 only if ambient light conditions are such that it is necessary to have backlighting of the pad part.

The circuit diagram of FIG. 3 also depicts an array of switches associated with each of the switch actuators 14 and 16, these switches being indicated by reference numerals S1 through S13 and wherein switch S1 is a programming switch which may be actuated by an actuator 14a, FIG. 1. The switch array illustrated in the circuit diagram of FIG. 3 interfaces with the microcontroller U1 via the connector tabs indicated for terminals RC3, RC4, RC5, RA1, RA1, RA3 and RA4. The circuit diagram of FIG. 3 also illustrates a power supply circuit including a regulator circuit U2. When any switch S1 through S13 is actuated, a ground path is created for the enable output of the regulator U2 which turns on and supplies power to the microcontroller U1. Microcontroller U1 then executes programmed instructions and outputs a voltage that energizes transistor Q4, which, in turn, maintains regulator U2 in an on mode. Microcontroller U1 is also operably connected to a radio frequency (RF) circuit, as shown, for transmitting door open/close signals to a door operator, not shown.

An indicator LED DS1 flashes at various rates for user feedback. For example, the microcontroller U1 monitors the switches S1 through S13 of the controller and when a key is pressed, the microcontroller via transistor Q2 flashes LED DS1 to give the user positive feedback that the switch has been pressed. LED DS1 is also depicted by the reference numeral 14b in FIG. 1 which may be a light transmitting portion of pad part 20 projecting through a suitable opening in cover 13, as illustrated.

The microcontroller U1 may be programmed to periodically test ambient light conditions by de-energizing LED 22, measuring ambient light and then resuming energization of LED 22 at a voltage commensurate with ambient light conditions which may warrant backlighting the pad part 20 and the switch actuators 14, 14a and 16.

Figure 4:
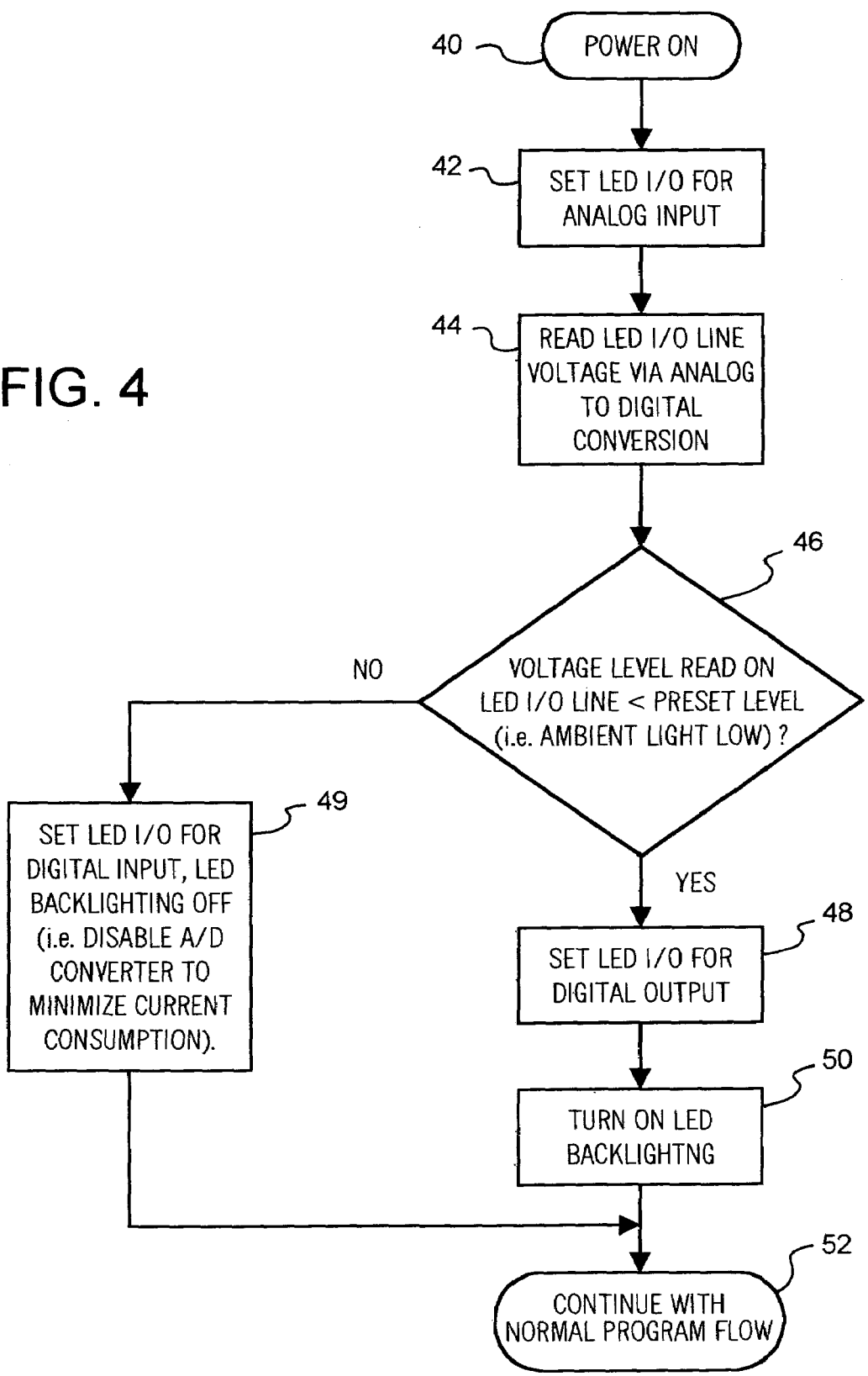
FIG. 4 is a flow diagram showing the steps executed by control circuitry for adjusting the intensity of light emitted by an LED light source for the controller unit.

Referring briefly to FIG. 4, there is illustrated a flow diagram of steps executed by the microcontroller U1 to sense ambient light and set the voltage applied to the LED 22. As shown in FIG. 4, power on to the microcontroller U1 is indicated at step 40. Step 42 indicates setting the LED input/output terminal for analog input and step 44 indicates reading the voltage output of the LED via an analog to digital conversion and which is indicative of the intensity of ambient light falling on the controller unit 10.

As the routine proceeds to step 46, the voltage level read from the LED is compared with a preset low ambient light voltage signal and if the voltage is less than the preset value the routine proceeds to set the LED input/output terminal for a digital output signal at step 48 which then results in energizing the LED to backlight the switch actuators 14 and 16 at a predetermined intensity as determined by the comparison of the voltage level read on the LED I/O line. Step 50 indicates the microcontroller U1 actually energizing the LED and step 52 indicates continuation of the normal routine programmed into the microcontroller U1 which may, periodically, call for repeating the steps shown in FIG. 4. As indicated in FIG. 4, if the voltage level read on the LED I/O line or pin is not less than the preset level the program is set for the LED I/O line to provide a digital input signal. However, the LED 22 is not energized since ambient light is indicated to be sufficient, as indicated at step 49 in FIG. 4. Thus, electrical current consumption is minimized and battery life is improved since the switch actuators 14 and 16 are not backlit when not required to be.

Table 1 is a list of components found in the circuit diagram of FIG. 3 and indicating general operating parameters and a typical commercial source, respectively.

TABLE 1

| Reference Designator | Description | Example of Commercial Source |
| --- | --- | --- |
| Cx | Industry Standard Capacitors | Murata/AVX |
| Rx | Industry Standard Resistors | SEI |
| Dx | Industry Standard Diodes | Rohm |
| D1 | Zener Diode | Vishay |
| DS1 | Light Emitting Diode | Kingbright Corp. |
| DS4 | Light Emitting Diode | Kingbright Corp. |
| Qx | Industry Standard Transistor Module | Rohm |
| Sx | Carbon Pill Switch | ITT |
| U1 | Microcontroller | Microchip #PIC16F676 |
| U2 | Low Dropout Voltage Regulator | Texas Instruments #TPS76950 |

Although a preferred embodiment of the invention has been described and shown in detail, those skilled in the art will recognize that various modifications and substitutions may be made without departing from the scope and spirit of the appended claims.

What is claimed is:

1. A battery operated controller for a door operator comprising:
    a light transmitting switch actuator pad including plural switch actuators and operable to transmit visible light from a light source comprising a light emitting diode;
    said light emitting diode is positioned such as to backlight said switch actuator pad and to sense ambient light transmitted directly from said switch actuator pad to said light emitting diode;
    a circuit including said light emitting diode for generating visible light to illuminate said switch actuator pad; and
    a microcontroller operably connected to said circuit including said light emitting diode for sensing ambient light on said switch actuator pad and for energizing said light emitting diode when said ambient light is less than a predetermined intensity, said microcontroller is programmed to periodically deenergize said light emitting diode, measure the intensity of ambient light transmitted by said switch actuator pad to said light emitting diode and energize said light emitting diode if the measured intensity is less than a predetermined amount, said microcontroller further being operable for converting a voltage signal from said light emitting diode to a digital signal, comparing said digital signal to a preset signal corresponding to a level of ambient light intensity and energizing said light emitting diode at a voltage related to the intensity of ambient light and producing an intensity of light emitted by said light emitting diode required to compensate for insufficient ambient light.

2. The controller set forth in claim 1 including:
    plural switches associated with said switch actuators, respectively, and operably connected to said microcontroller by way of a regulator circuit for enabling said microcontroller in response to actuation of any of said switches.

3. The controller set forth in claim 2 including:
    a visual indicator operably connected to said microcontroller and responsive to an output signal from said microcontroller which is responsive to actuation of one or more of said switches to provide a visual user feedback signal.

4. The controller set forth in claim 3 including:
    a switch operably connected to said microcontroller and said indicator and responsive to a signal from said microcontroller for energizing said indicator.

5. The controller set forth in claim 2 including:
    a switch operably connected to said microcontroller and to said regulator circuit and operable to maintain said regulator circuit in a condition to enable said microcontroller.

6. The controller set forth in claim 2 including:
    a radio frequency transmitter operably connected to said microcontroller and responsive to actuation of selected ones of said switches to transmit a signal to a door operator.

7. A battery operated controller for a door operator comprising:
    a light transmitting switch actuator pad including plural switch actuators and operable to transmit visible light from a light source comprising a light emitting diode;
    said light emitting diode is positioned such as to backlight said switch actuator pad and to sense ambient light transmitted directly from said switch actuator pad to said light emitting diode;
    a circuit including said light emitting diode for generating visible light to illuminate said switch actuator pad;
    a microcontroller operably connected to said circuit including said light emitting diode for sensing ambient light on said switch actuator pad and for energizing said light emitting diode when said ambient light is less than a predetermined intensity, said microcontroller is programmed to periodically deenergize said light emitting diode, measure the intensity of ambient light transmitted by said switch actuator pad to said light emitting diode and energize said light emitting diode if the measured intensity is less than a predetermined amount, said microcontroller further being operable for comparing a signal from said light emitting diode to a preset signal corresponding to a level of ambient light intensity and energizing said light emitting diode at a voltage related to the intensity of ambient light and producing an intensity of light emitted by said light emitting diode required to compensate for insufficient ambient light;
    plural switches associated with said switch actuators, respectively; and
    a regulator circuit operably connected to said switches and said microcontroller for enabling said microcontroller in response to actuation of any of said switches.

8. The controller set forth in claim 7 including:
    a switch operably connected to said microcontroller and to said regulator circuit and operable to maintain said regulator circuit in a condition to enable said microcontroller.

9. The controller set forth in claim 7 including:
    a radio frequency transmitter operably connected to said microcontroller and responsive to actuation of selected ones of said switches to transmit a signal to a door operator.

10. A battery operated controller for a door operator comprising:
    a light transmitting switch actuator pad including plural switch actuators and operable to transmit visible light from a light source comprising a light emitting diode;
    said light emitting diode is positioned such as to backlight said switch actuator pad and to sense ambient light transmitted directly from said switch actuator pad to said light emitting diode;

a circuit including said light emitting diode for generating visible light to illuminate said switch actuator pad;

a microcontroller operably connected to said circuit including said light emitting diode for sensing ambient light on said switch actuator pad and for energizing said light emitting diode when said ambient light is less than a predetermined intensity, said microcontroller is programmed to periodically deenergize said light emitting diode, measure the intensity of ambient light transmitted by said switch actuator pad to said light emitting diode and energize said light emitting diode if the measured intensity is less than a predetermined amount, said microcontroller further being operable for comparing a signal from said light emitting diode to a preset signal corresponding to a level of ambient light intensity and energizing said light emitting diode at a voltage related to the intensity of ambient light and producing an intensity of light emitted by said light emitting diode required to compensate for insufficient ambient light; and a visual indicator operably connected to said microcontroller and responsive to an output signal from said microcontroller which is responsive to actuation of one or more switches associated with said switch actuators, respectively, to provide a visual user feedback signal by way of said switch actuator pad.

11. The controller set forth in claim 10 including:

a switch operably connected to said microcontroller and to a regulator circuit and operable to maintain said regulator circuit in a condition to enable said microcontroller.

12. The controller set forth in claim 11 including:

a radio frequency transmitter operably connected to said microcontroller and responsive to actuation of selected ones of said switches to transmit a signal to a door operator.

* * * * *